(12) United States Patent
Arnold et al.

(10) Patent No.: US 10,018,107 B2
(45) Date of Patent: Jul. 10, 2018

(54) BALANCED VANES AND INTEGRATED ACTUATION SYSTEM FOR A VARIABLE GEOMETRY TURBOCHARGER

(71) Applicant: Kangyue Technology Co., Ltd, Shouguang, Shandong Province (CN)

(72) Inventors: Steven Don Arnold, Rancho Palos Verdes, CA (US); Wang Hang, Shouguang (CN); Li Yanzhao, Shouguang Development Area (CN); Xiaofen Xin, Shouguang (CN)

(73) Assignee: Kangyue Technology Co., Ltd, Shangdong (CN)

( * ) Notice: Subject to any disclaimer, the term of this patent is extended or adjusted under 35 U.S.C. 154(b) by 206 days.

(21) Appl. No.: 14/796,798

(22) Filed: Jul. 10, 2015

(65) Prior Publication Data

US 2017/0009645 A1    Jan. 12, 2017

(51) Int. Cl.
| | |
|---|---|
| *F01D 17/16* | (2006.01) |
| *F02B 37/22* | (2006.01) |
| *F02B 37/24* | (2006.01) |

(52) U.S. Cl.
CPC .............. *F02B 37/22* (2013.01); *F02B 37/24* (2013.01); *Y02T 10/144* (2013.01)

(58) Field of Classification Search
CPC .......... F02B 37/22; F01D 17/10; F01D 17/12; F01D 17/14; F01D 17/16; F01D 17/165; F01D 17/26; F04D 27/002; F04D 27/0246
See application file for complete search history.

(56) References Cited

U.S. PATENT DOCUMENTS 8,056,336 B2 * 11/2011 Arnold .................... F01D 11/00
  415/162
2011/0312246 A1    12/2011 Mohamed et al.

FOREIGN PATENT DOCUMENTS

WO    0169045 A1    9/2001

* cited by examiner

*Primary Examiner* — Richard Edgar
(74) *Attorney, Agent, or Firm* — Felix L. Fischer

(57) ABSTRACT

A variable geometry turbine (VGT) for turbochargers incorporates a turbine nozzle having a plurality of vanes, each vane having an airfoil with an inner disc and an outer disc. A first nozzle plate incorporates pockets to receive the inner discs with the inner discs substantially flush with a nozzle surface on the first nozzle plate. A second nozzle plate has pockets to receive the outer discs with outer discs substantially flush with a second nozzle surface. An integral actuation system rotates the plurality of vanes for variation of the nozzle geometry.

16 Claims, 17 Drawing Sheets

BALANCED VANES AND INTEGRATED ACTUATION SYSTEM FOR A VARIABLE GEOMETRY TURBOCHARGER

BACKGROUND OF THE INVENTION

Field of the Invention

This invention relates generally to the field of charge air boosting of internal combustion engines and more particularly to a variable geometry turbine employing balanced variable vanes and a hydraulic servo driven by a proportional solenoid for vane closing with a reaction spring for vane opening.

Description of the Related Art

Variable Geometry Turbines (VGT) for turbochargers have become very popular in various automotive and truck market segments over the past 20 years. All major turbocharger manufacturers now have VGTs in production. The capability of the VGT to increase the controllability of the air flow to the engine has proven to be of great value to certain engine market segments. The VGT can be used to vary the air fuel ratio (AF), improve the transient response of the turbocharger, provide additional back pressure to the engine to drive external cooled EGR, and/or provide additional back pressure to augment decompression braking.

This increased capability does have certain drawbacks. For example increased turbocharger cost, decreased reliability, reduced durability, additional noise, more difficult packaging of the turbocharger in the engine compartment, and increased complexity in troubleshooting.

There have been attempts to mitigate some of these negative factors with a reduced cost design by using fewer and simpler parts which can be made using net-shape technologies, and integrated actuation. The integrated actuation improves the packaging by reducing the total volume, and reduces the number of failure modes related to non-integrated, bolt on actuation.

Electro-hydraulic actuation as used on embodiments disclosed in U.S. Pat. No. 6,269,642 issued on Aug. 7, 2001, eliminates the need for external power to be brought to the turbocharger and instead uses the oil system supplied for lubrication and damping as a power source. An additional advantage to this is that it carries heat away rather than creating more heat as an electrical actuation system would.

However, a number of problems still exist with this type of design. To achieve a simple one piece net shape vane, the actuation system was incorporated in the flow passage. This increases the temperature, level of contaminants, and disrupts the aerodynamic flow, thus leading to reduced durability. The unique vane/unison ring conjugate action limited the rotation of the vanes to about 20 degrees.

A double acting hydraulic servo with four way spool valve and proportional solenoid has a number of issues as well. Due to the double acting nature, a spool valve has to have a number of nested annular passages which results in small flow areas. This limits the response of the system and makes it highly dependent on the oil viscosity. With cold starts in frigid climates, this system will take minutes to become functional with appropriate response times. Another issue with a double acting system is that it is more costly. Twice as many control interfaces are required and the precision required of the system is very high.

The vane mechanism is the heart of the variable geometry turbine, and is the most expensive and most difficult to produce cost effectively with high reliability. Initial designs in the industry had many small, very precise parts which were made from super-alloys and machined or ground to very fine tolerances. The majority of the designs used a multi-piece vane/arm/lever that had to be welded during assembly. These designs were very costly and also resulted in cantilevered loads, where the aerodynamic torque on the vane had to be resisted by a force out of the plane of the vane or the support bearings. These complex cantilevered loadings result in much higher loads, particularly at the ends of the "bearings" or supports. Since the vane mechanism has to move billions of times in its life, live in a high vibration environment, survive temperatures above 700 C, in a oxidizing atmosphere, with no lubrication and no sticking or binding, additional loads trying to cock the vane in the bearing are very problematic.

It is therefore desirable to provide a variable geometry turbocharger which overcomes the shortcomings of the prior art to allow lower cost, higher durability and reliability, expanded range flexibility and improved response under all ambient conditions.

SUMMARY OF THE INVENTION

The embodiments of the present application describe a variable geometry turbine (VGT) for turbochargers incorporating a turbine nozzle having a plurality of vanes, each vane having an airfoil with an inner disc and an outer disc. A first nozzle plate incorporates pockets to receive the inner discs with the inner discs substantially flush with a nozzle surface on the first nozzle plate. A second nozzle plate has pockets to receive the outer discs with outer discs substantially flush with a second nozzle surface. An integral actuation system rotates the plurality of vanes for variation of the nozzle geometry.

In disclosed embodiments, the actuation system employs a single acting hydraulic servo driven by a proportional solenoid. The servo incorporates a spool positioned by a pin of the proportional solenoid. The spool has an oil supply metering edge and a drain metering edge positionable for connecting an oil source and an oil drain, respectively, with a passage. A piston is received in a chamber in a center housing with the chamber having a pressure cavity in communication with the passage. The piston translates toward a drain cavity in the chamber responsive to connection of the oil source to the passage and translates toward the pressure cavity responsive to connection of the oil drain to the passage. The piston positions a drive lever rotating the vane system in the turbine nozzle.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The embodiments described herein provide a VGT nozzle for a turbocharger that employs simplified vanes having pressure balancing discs each with a pin extending through the vane between a first nozzle plate and a second nozzle plate for rotational support and spacing of the nozzle plates. An integrated solenoid driven hydraulic servo actuator is employed for rotation of the vanes. The actuator incorporates a spring balanced hydraulic piston internally engaging a cam for rotation of a vane drive axle to a master vane with a unison ring for mutual rotation of the remaining vanes.

Figure 1:
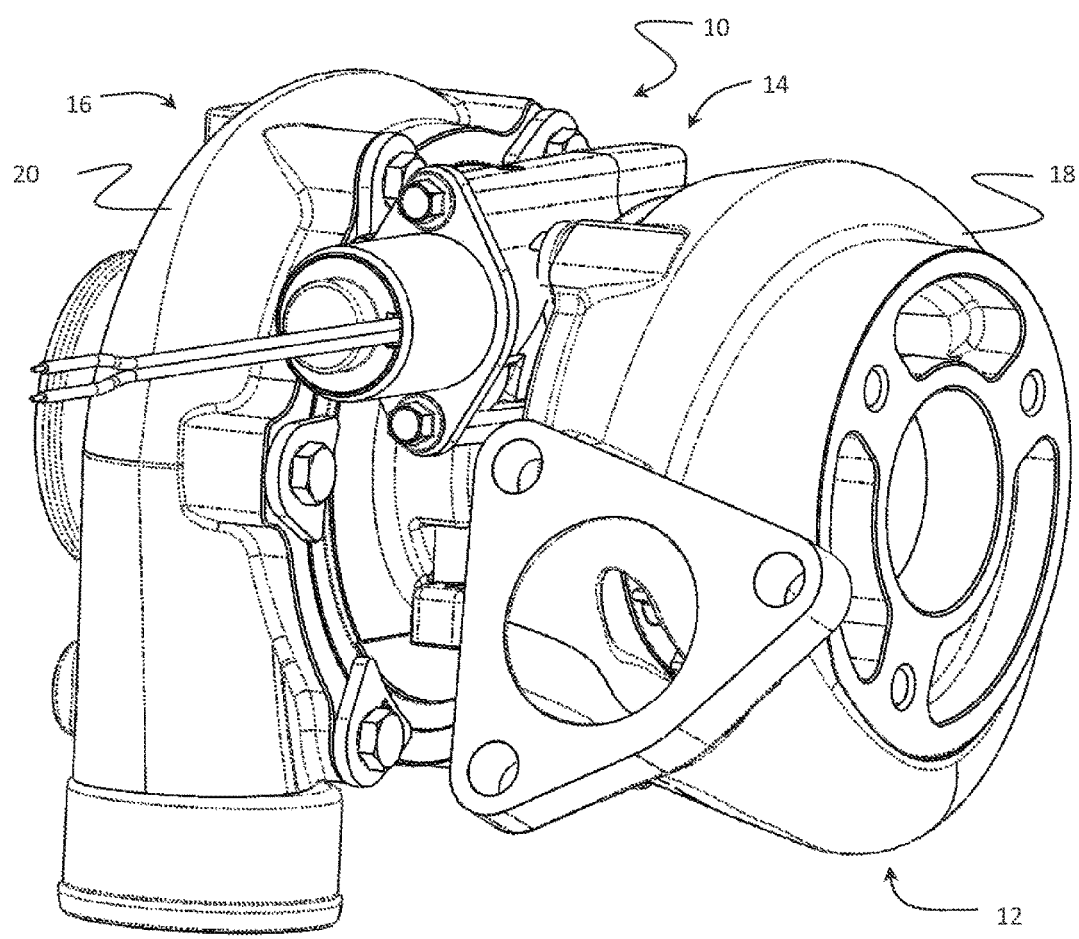
FIG. 1 is a perspective view of a turbocharger in which the described embodiment may be employed.
Figure 2:
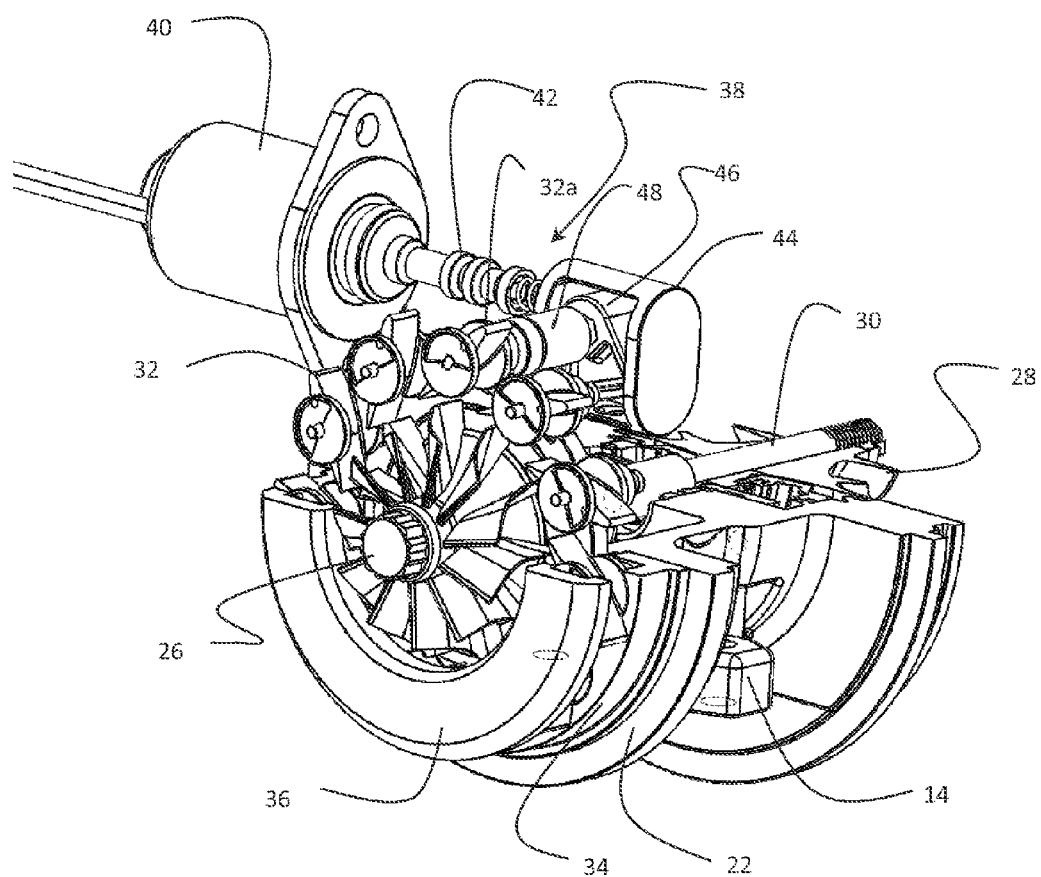
FIG. 2 is a partially sectioned view of the turbocharger of FIG. 1 showing details of the embodiment.

Referring to the drawings, FIG. 1 show a turbocharger 10 having a turbine assembly 12, a center housing 14 and a compressor assembly 16. The turbine assembly 12 is contained within a turbine housing 18 and the compressor assembly is contained within a compressor housing 20 which are attached to the center housing 14. FIG. 2 shows the turbocharger 10 with the turbine housing and compressor housing removed for clarity and partially sectioned to display the internal components of the turbocharger. A turbine back plate 22 and compressor back plate 24 extend from the center housing 14 for attachment of the turbine housing 18 and compressor housing 20, respectively. A turbine wheel 26 is connected to a compressor wheel 28 with a shaft 30 supported by bearing assemblies in the center housing 14.

The VGT nozzle is provided by multiple vanes 32, which will be described in greater detail subsequently, circularly arrayed around the turbine wheel 26 between a first nozzle plate 34 and a second nozzle plate 36. While shown in the drawings for the exemplary embodiment as evenly spaced, the vanes can be equally spaced or, in alternative embodiments, unequally spaced to lower the tonal acoustic emissions. Rotational positioning of the vanes 32 is accomplished with an integral actuator 38 contained within the center housing 14. A solenoid 40, hydraulic metering spool 42 and piston 44, the operation of which will be described in detail subsequently, position a lever 46 which drives an actuating shaft 48 to rotate a master vane 32a.

The vane mechanism is the heart of the VGT, and in the prior art has been the most expensive and most difficult to produce cost effectively with high reliability. Prior art designs in the industry had many small, very precise parts which were made from super-alloys and machined or ground to very fine tolerances. The majority of the designs used a multi-piece vane/arm/lever that had to be welded during assembly. These designs were very costly and also resulted in cantilevered loads, where the aerodynamic torque on the vane had to be resisted by a force out of the plane of the vane or the support bearings. These complex cantilevered loadings result in much higher loads, particularly at the ends of the "bearings" or supports. Since the vane mechanism has to move billions of times in its life, in a high vibration environment with temperatures above 700 C and an oxidizing atmosphere, with no lubrication and no sticking or binding, additional loads trying to cock the vane in the bearing are very problematic.

The vanes 32 in the present embodiment provide a novel geometry that allows the vanes and their actuating interface to be made as one piece using net shape technology and are manufacturable without expensive machining. The actuation force reacting the vane aerodynamic force is moved to be within the span of the support bearing(s) and flow disruption is minimized. The temperature at the wearing interface is reduced by moving the actuating interface mechanism out of the gas flow passage. Friction and wear is avoided by balancing the axial thrust force on the one piece vane to a net zero. The vanes 32 have at least 35 degrees of rotation to achieve a high turn-down ratio in the turbine nozzle.

Figures 3A, 3B:
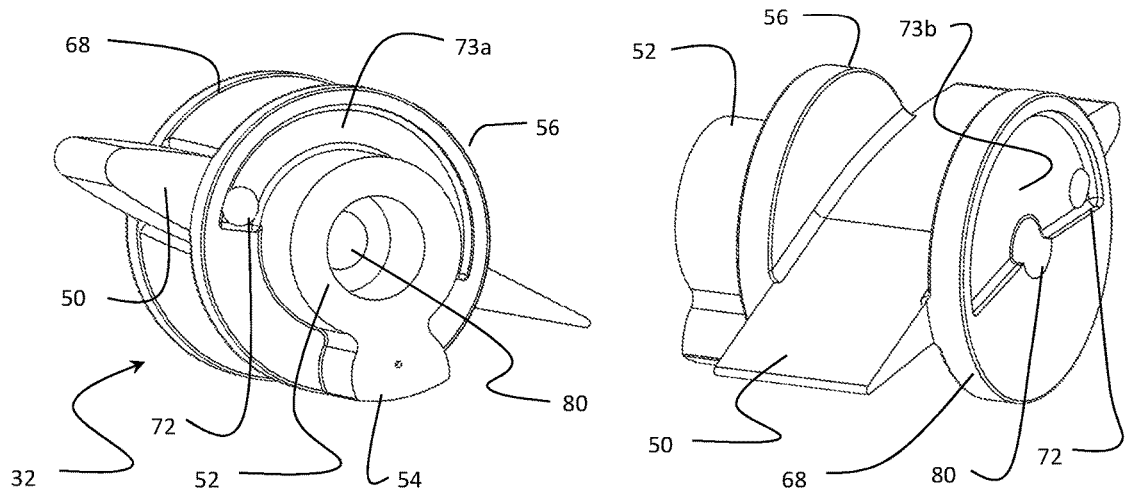
FIG. 3A is a perspective rear view of a vane for use in the embodiment.
FIG. 3B is a perspective front view of the vane.
Figure 4A:
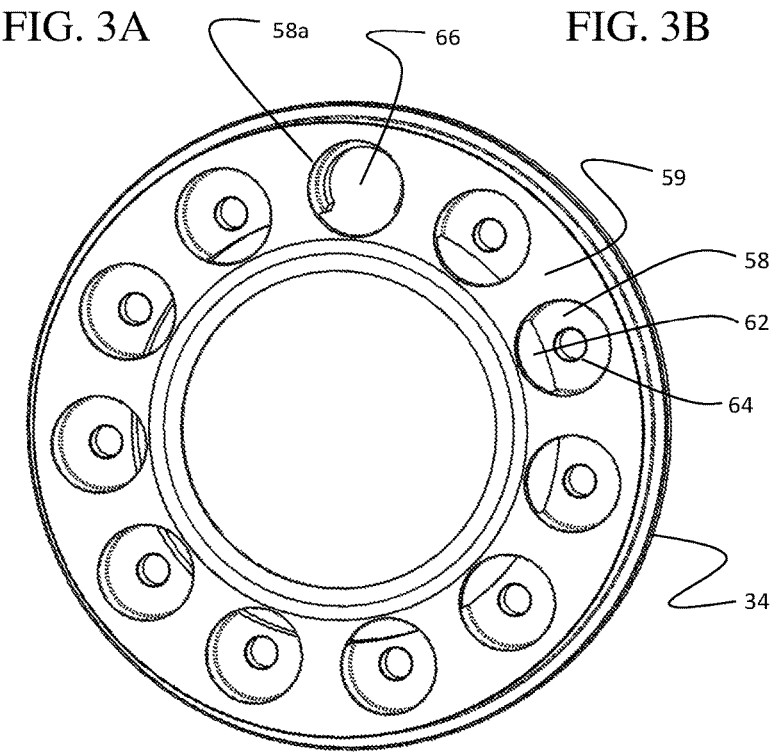
FIG. 4A is a perspective front view of a first nozzle plate for use in the embodiment.
Figure 4B:
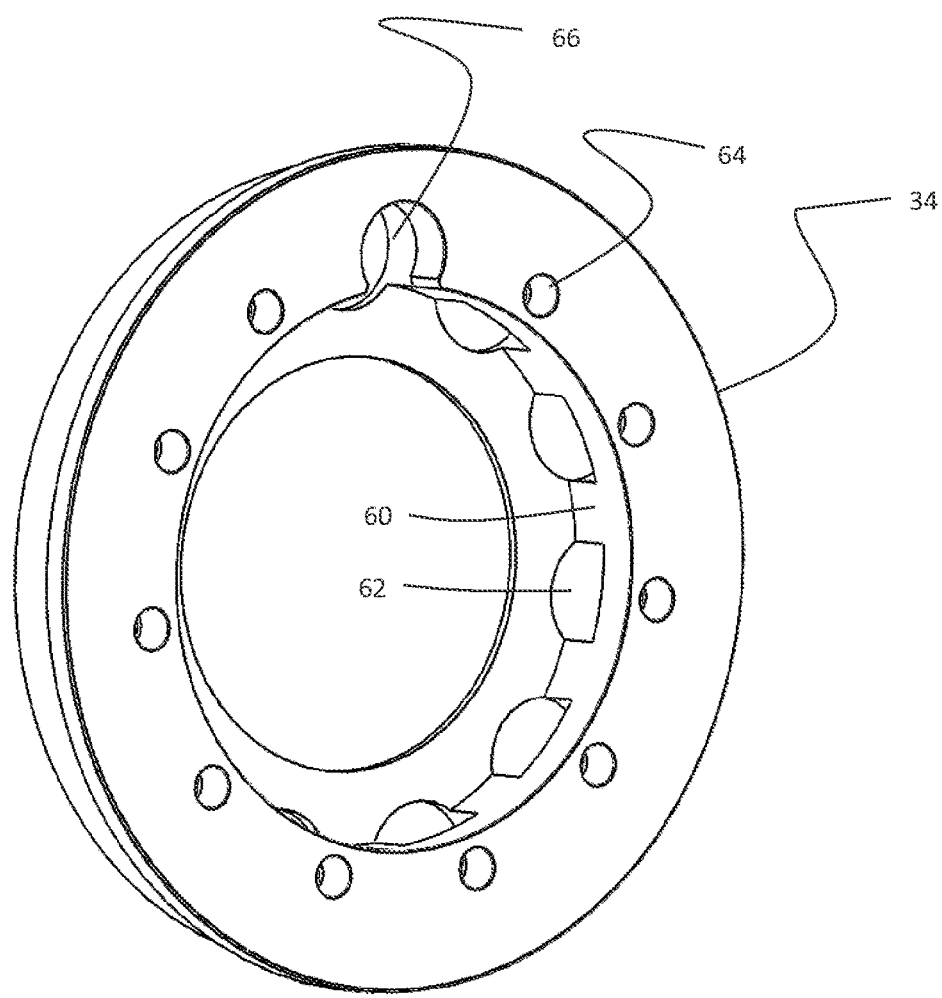
FIG. 4B is a perspective rear view of the first nozzle plate.
Figure 5:
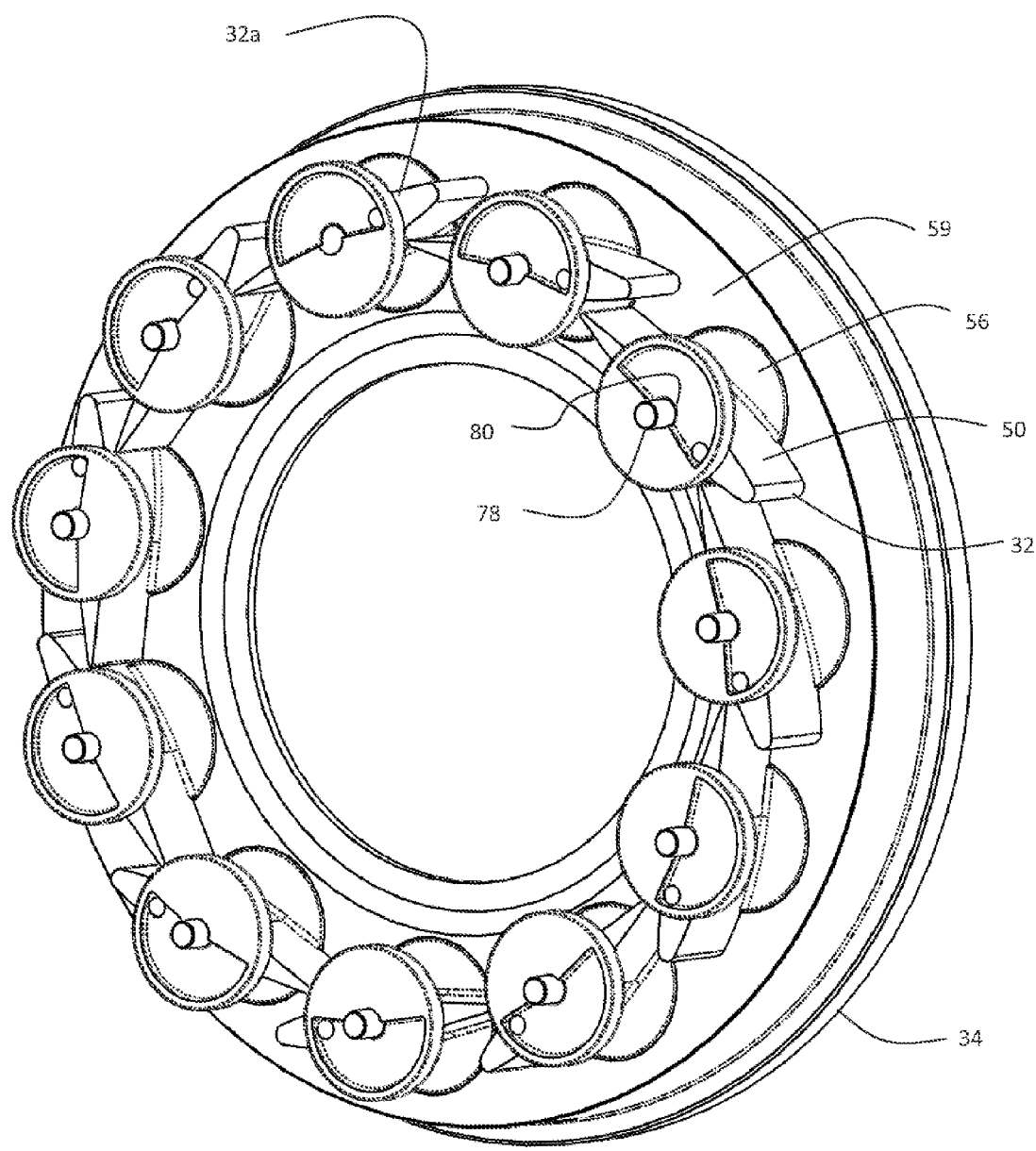
FIG. 5 is a perspective front view of the first nozzle plate with vanes installed.

As shown in FIGS. 3A and 3B, each vane 32 includes an airfoil 50 and a drive peg 52 having a key 54 to be received in the unison ring as will be described in greater detail subsequently. An inner disc 56 extends from the interface of the airfoil and drive stub to provide smooth airflow in the nozzle by providing an interface between the vane 32 and first nozzle plate 34. As seen in FIGS. 4A and 4B the first nozzle plate 34 has pockets 58 that receive the drive pegs 52 and are sized to closely receive the discs 56 flush with a first nozzle surface 59 as best seen in FIG. 5. The pockets 58 are relieved through an inner circumference wall 60 providing windows 62 through which the keys 54 extend. Bores 64 extend through the pocket bottoms to receive a bearing pin, as will be described in greater detail subsequently. To accommodate the master vane 32a, a master pocket 58a incorporates an enlarged bore 66 to receive the actuating shaft 48 as described with respect to FIG. 2.

Figure 6:
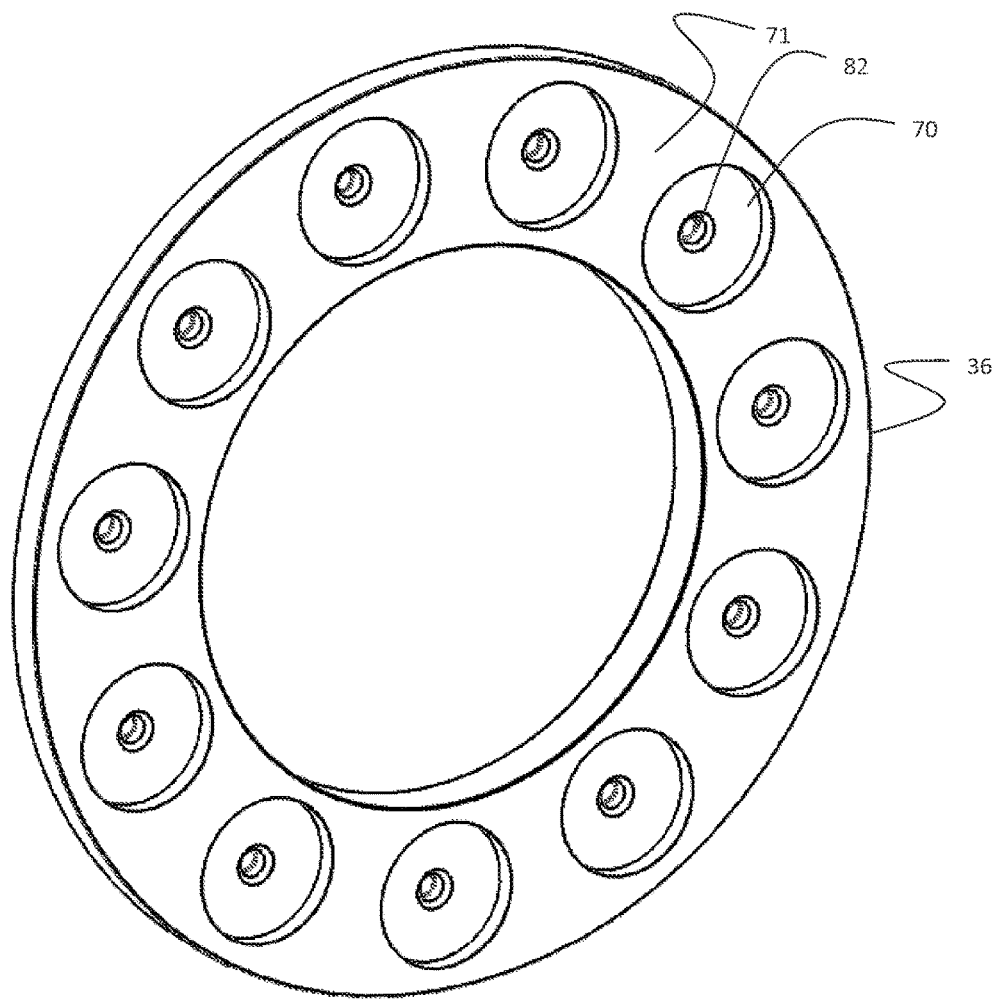
FIG. 6 is a perspective rear view of a second nozzle plate.

For pressure balancing the vanes 32 an outer disc 68 is provided extending from the airfoil opposite the disc 56. The outer discs 68 for the vanes 38 are received in outer pockets 70 in the second nozzle plate 36 to be flush with a second nozzle surface 71 as seen in FIG. 6. To assure equal pressure distribution on the discs 56 and outer discs 68 a pressure equalization bore 72 extends through the discs and airfoil 50. The inner and outer discs employ reliefs or pockets 73a, 73b to provide a plenum volume to dampen pulses, to equalize the pressures and to make certain that the pressure equalization bore 72 is not obstructed. In addition, leakage around the vanes is undesirable and the reliefs 73a, 73b may be employed to prevent the plenum volume from connecting upstream of the vane and downstream of the vane.

Figure 7:
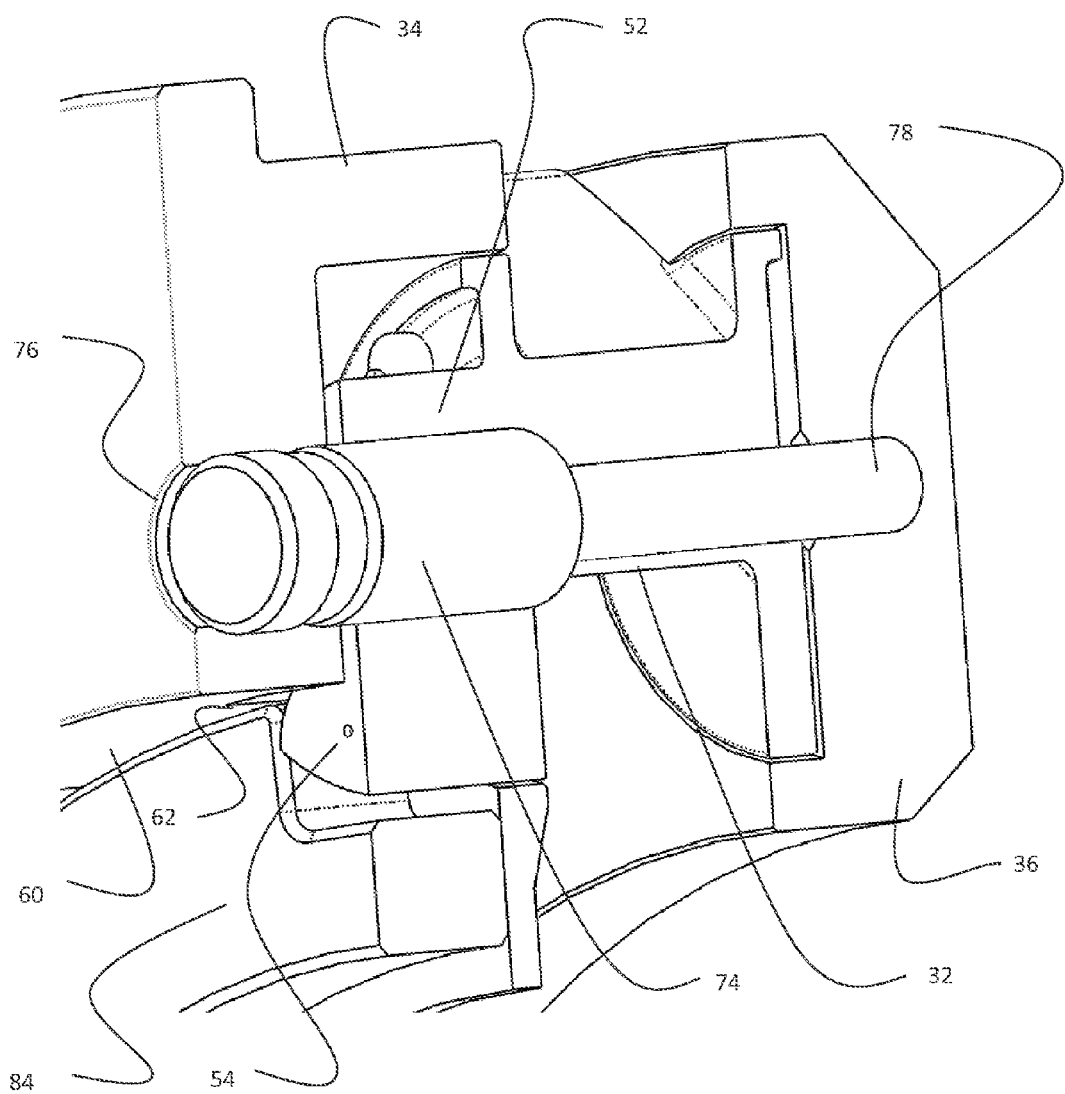
FIG. 7 is a sectioned perspective rear view of the first nozzle plate, vane and unison ring.

Since the pockets 58 in the first nozzle plate are quite large, using this as a bearing surface for the vane to rotate on is not feasible due to the high friction created by the large moment arm. To provide a low friction bearing surface, as shown in FIG. 7, a pin 74 is pressed into a bore 76 in the first nozzle plate 34 and is closely received in an aperture 77 in the vane drive peg 52. The vane drive peg 52 rotates on the diametric surface of the pin 74.

Customarily, the second nozzle plate is positioned by attaching to the turbine housing or by stand-off pins protruding from the face of the first nozzle plate. A turbine housing is not axisymmetric so the thermal transients that the turbine housing is subjected to results in nozzle mounting faces that are not necessarily parallel or concentric. Variable geometry turbines in the prior art which rely on this type of mounting have to have additional vane side clearance to assure that the vanes do not bind during transient operation of the engine. This reduces the efficiency, especially when the vanes are exerting a significant turning or acceleration of the flow. Stand-off pins are also aerodynamic impediments to the flow and cause a flow disruption and flow distortion. They also induce an additional harmonic element to the flow field which can increase the noise of the turbocharger.

The present embodiment avoids these problems. The bearing pin 74 for each of the vanes has post 78 that extends through a central hole 80 concentric with aperture 77 in the vane 32 including the outer disc 68 (also seen in FIGS. 3A and 3B) and protrudes beyond the outer disc 68 of the vane as shown in FIG. 5. This provides an exact spacer for the second nozzle plate 34 to rest upon. The post 78 has a clearance with the hole through the vane so it does not create additional friction. Each vane (except the drive vane 32a, which drives the unison ring) has this spacer feature and the second nozzle plate 36 axial position is well controlled.

Figure 8:
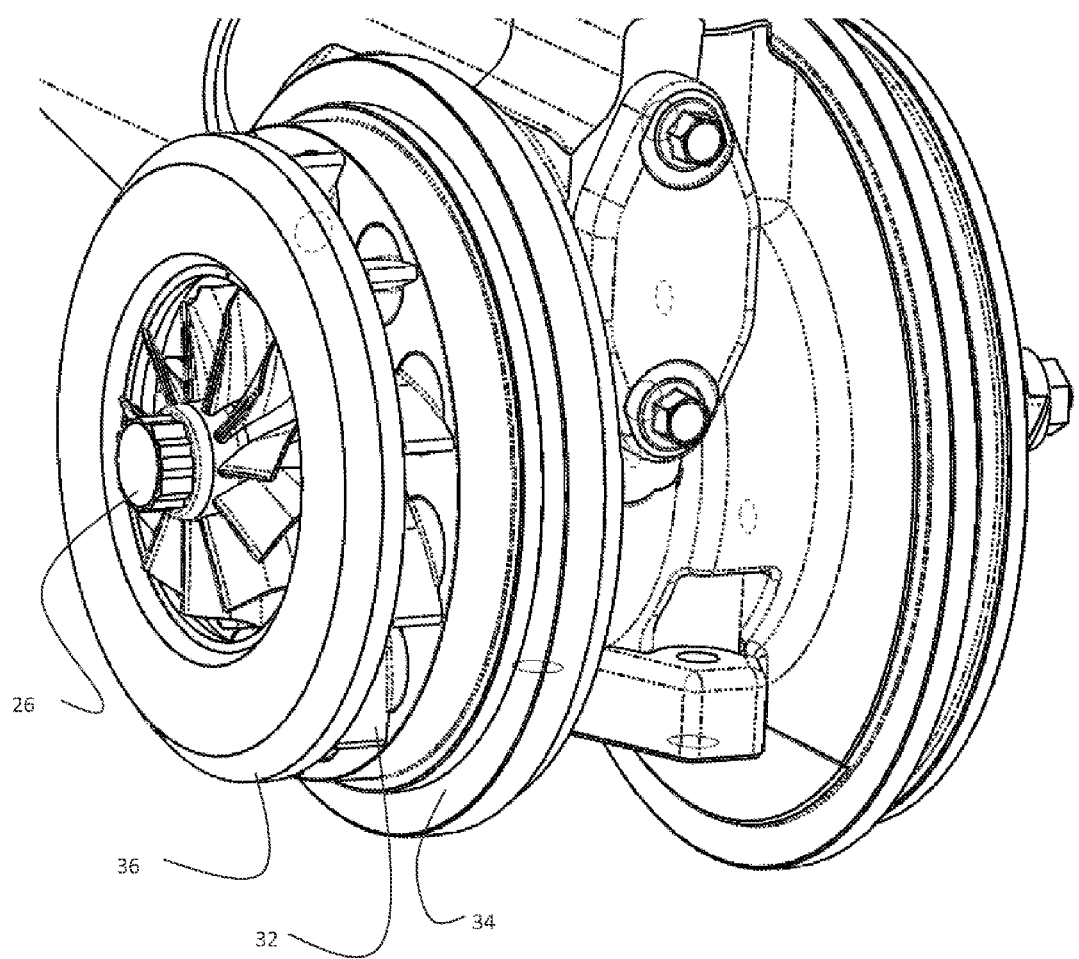
FIG. 8 is a perspective front view showing the assembled first nozzle plate, vanes and second nozzle plate.

The second nozzle plate does not need to be firmly attached to the posts 78 and the posts are received in reliefs 82 in the pockets 70 as seen in FIG. 6. Upstream pressure from the turbine is fed to the backside of the nozzle plate causing a net thrust on the plate to move to be in contact with the spacer posts. The face of the second nozzle plate in contact with the hot gas flow will be at a lower pressure as the flow is accelerating through the nozzle and pressure is converted to velocity. Thus there is always a net pressure on the second nozzle plate pushing it into contact with the spacer posts 78. The assembled first and second nozzle plates 34, 36 with the vanes 32 are shown in FIG. 8.

Returning to FIG. 7, a unison ring 84 is concentrically received by the inner circumference wall 60. As previously described with respect to FIGS. 4A and 4B, the pockets 58 are relieved through the inner circumference wall 60 providing windows 62 through which the keys 54 extend. The unison ring 84 has circumferentially spaced notches 86 to receive the keys 54. Rotation of the master vane 32a by the actuating shaft 48 causes rotation of the unison ring with commensurate rotation of all of the vanes 32 through keys 54.

Control of the variable geometry system in prior art VGT turbochargers has typically required a separate actuation system designed to bolt to the turbocharger through a bracket and then connected by some means to a shaft extending through the turbine housing which facilitates the variable geometry movement. This is not ideal from many viewpoints: packaging, magnification of engine vibration, protection from heat of the turbine, calibration, leakage of hot gas through the actuating shaft, and tamper-proofing. Tamper-proofing is a challenge due to On-Board Diagnostic regulations as well as the cottage industry of the engine performance aftermarket, which sells kits to modify engine controls to circumvent emissions controls and extract more power from the engine.

The present embodiment incorporates the variable geometry mechanism as an integral system, incorporating the actuation components into the existing center housing. This reduces the vibration magnification caused by cantilevering an actuation system which has been bolted to the turbocharger through a bracket system. Moving the actuation to become an integrated part of the center housing reduces the vibration and also allows the actuation components to be cooled by the bearing lubricating oil. The actuating power required of the actuation system can then be provided by the existing oil system. This also aids tamper-proofing by eliminating connection adjustments as well as eliminating the ability to unbolt one actuation system and replace it with another design. The previously identified prior art design disclosed in U.S. Pat. No. 6,269,642 employed a double-acting hydraulic servo which resulted in certain shortcomings which are overcome by the embodiment disclosed herein.

Figure 9:
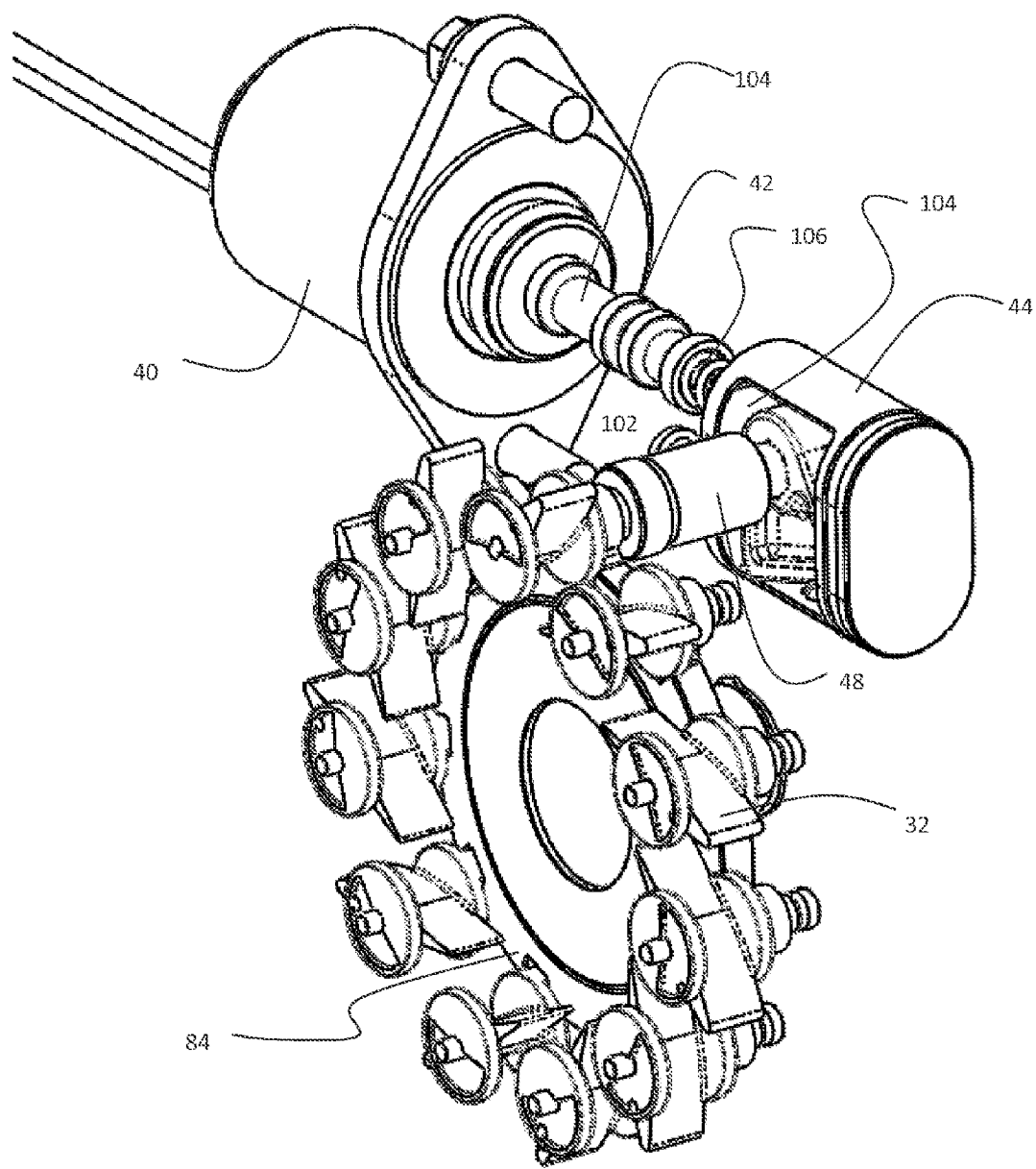
FIG. 9 is a perspective front view of the vanes, unison ring and drive elements.
Figure 10:
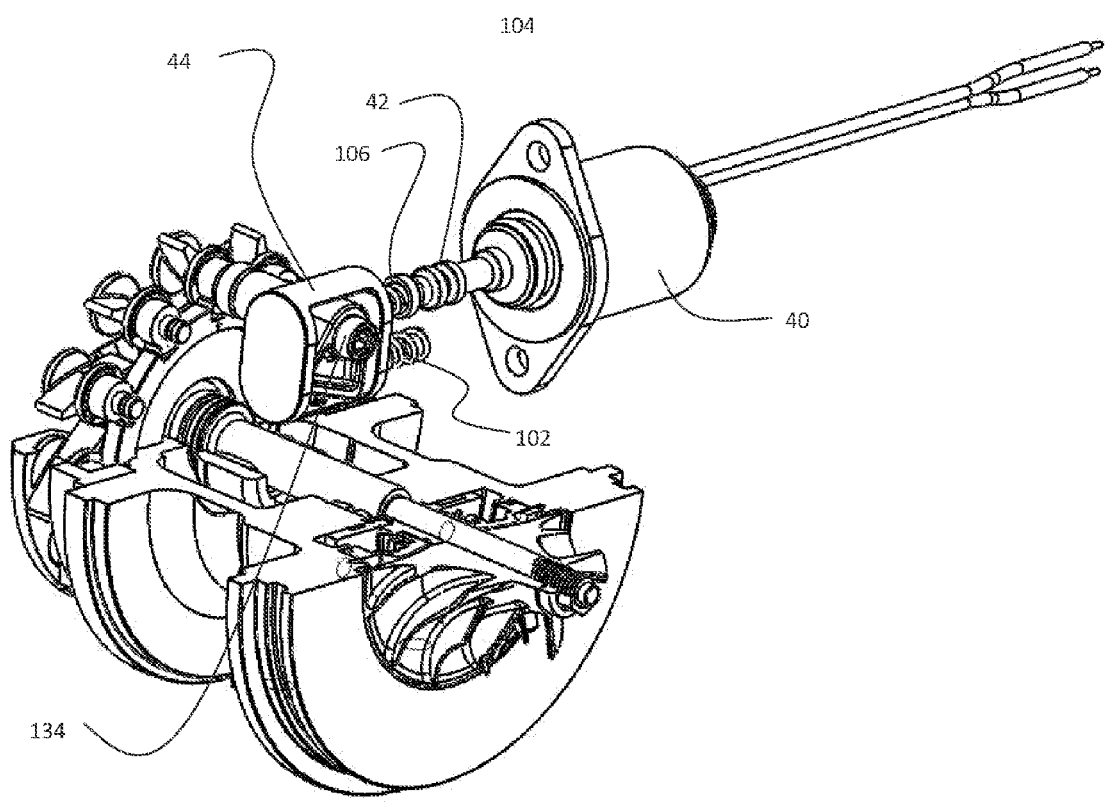
FIG. 10 is a partially sectioned view rear view of the turbocharger of FIG. 1.

The present embodiment uses a single acting hydraulic servo driven by a proportional solenoid. The components of the overall actuation system are shown in FIGS. 9 and 10. The hydraulic servo employs the spool 42 driven by solenoid 40 through pin 104 to move the piston 44 and therefore the vanes 32 in one direction and an return spring 102 works to move the vanes in the opposite direction. The piston 44 carried with the center housing 14, as previously described with respect to FIG. 2, provides actuation of the vanes 32 through the actuating shaft 48 and lever 46 as will be described subsequently The embodiment as a single acting system employs the return spring 102 to open the vanes and the hydraulic servo to close the vanes. The maximum force required by the system is to open the vanes when they are fully closed. If the spring is used to open the vanes, then it is at maximum compression at the point where the vanes are closed (and thus maximum spring force). The maximum vane force which occurs with the vanes in the closed position is offset by the spring force, and the hydraulic servo only has to have enough force to overcome the maximum spring force, but assisted by the vane force.

In the system provided in the embodiment, there is no surrogate signal (i.e. cam) for determining position of the piston 44; instead, the position of the piston is measured directly by a feedback spring 106 creating a force proportional to position of the piston. In addition, the force of the feedback spring 106 augments the force of the return spring 102.

Figure 11:
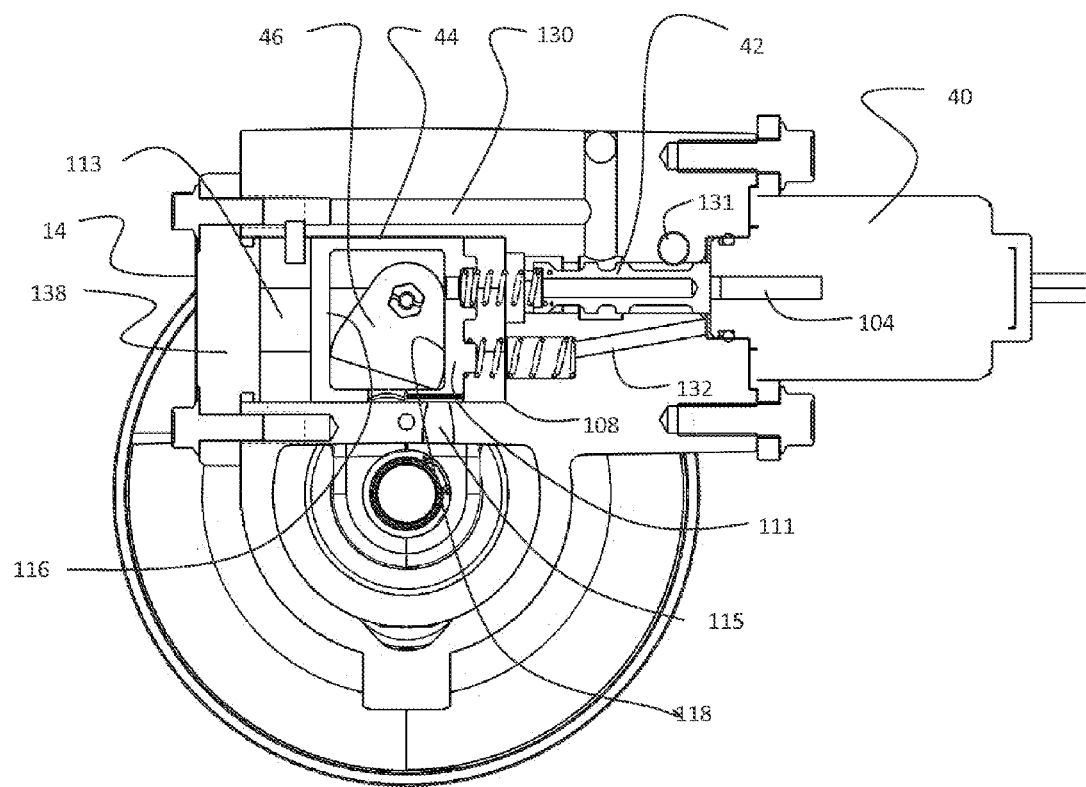
FIG. 11 is a side sectioned view of the turbocharger showing an integrated hydraulic servo actuator with solenoid in the vanes open position.

The piston 44 can be round as a traditional piston or oblong, as shown, when space requirements dictate that a round piston of sufficient area is too large to fit within the dimensions of the center housing. The piston is carried in a chamber 108 in the center housing 14 as shown in FIG. 11. Lever 46 is carried within the piston 44. The piston 44 moves the vanes by pushing on lever 46 connected to the actuating shaft 48 controlling the vanes.

Figure 13:
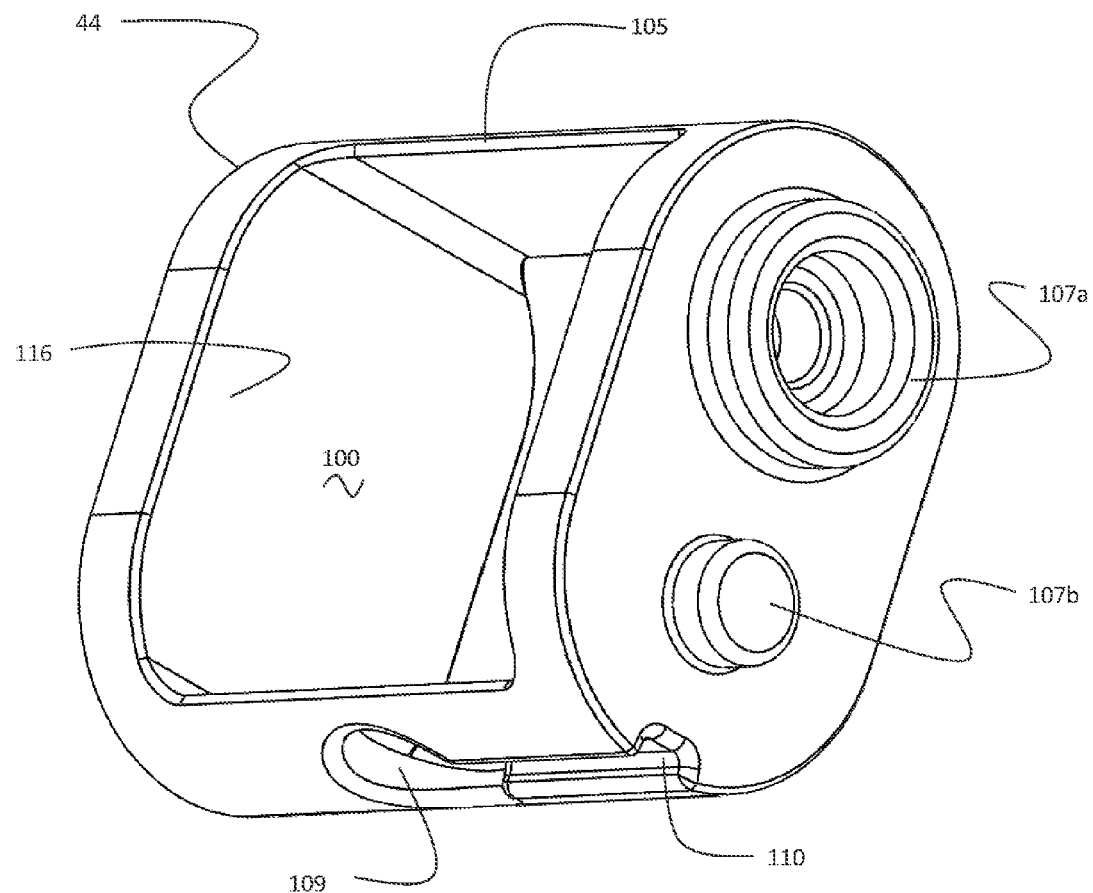
FIG. 13 is a perspective view of a hydraulic drive piston for the integrated actuator.

The piston 44 has hydraulic pressure to push it one direction and the return spring 102 and feedback spring 106 to push the opposite direction. Since the piston 44 must push the drive lever 46 both directions the drive lever is nested inside the piston and has a plane of symmetry through an axis of rotation of the principal vane 32a in the vane system. The piston 44 provides a cavity 100 with a cutout 105 for the drive lever 46 and actuating shaft 48 as shown in detail in FIG. 13. Since the actuating shaft 48 has a center that is at a fixed position, and the drive lever 46 rotates around that, but the piston 44 must traverse laterally, cavity 100 must be present in the piston to allow that traverse to happen without interference. The inside of the piston must remain at drain cavity pressure and not retain oil. The main drain of the actuating system is through an aperture 109 in the bottom of the piston wall. Additionally there is a relief 110 in the piston that connects the drain cavity 111 of chamber 108 between the piston and the spool (that includes both springs), to the main drain 115. The piston 44 incorporates spring locators for the return spring 102 and feedback spring 106. For the embodiment shown, an internal locator 107a is employed for the feedback spring and an external locator 107b is employed for the actuation spring.

Figure 14A:
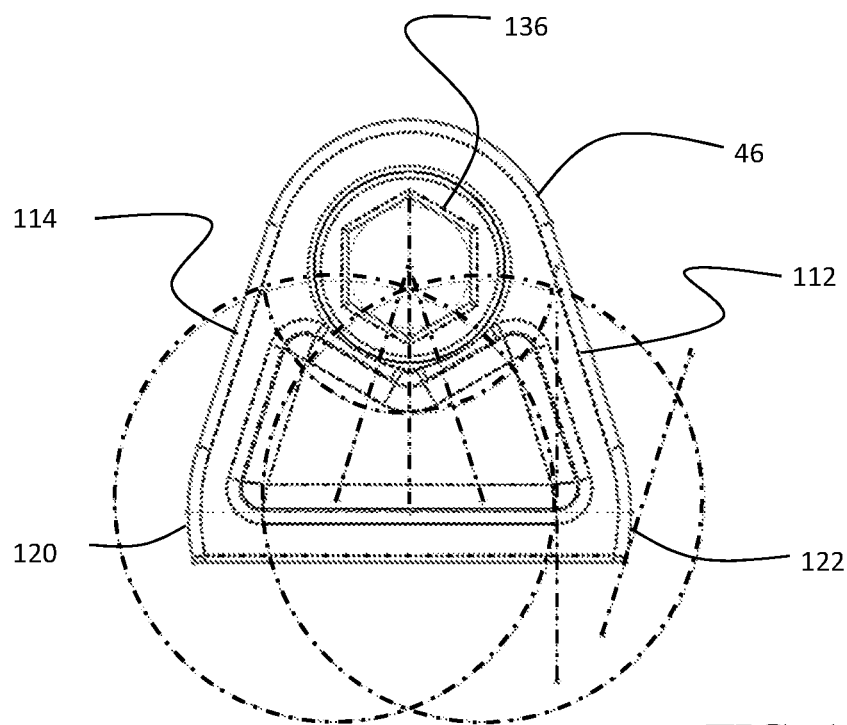
FIG. 14A is a side view of a drive cam for vane operation.
Figure 14B:
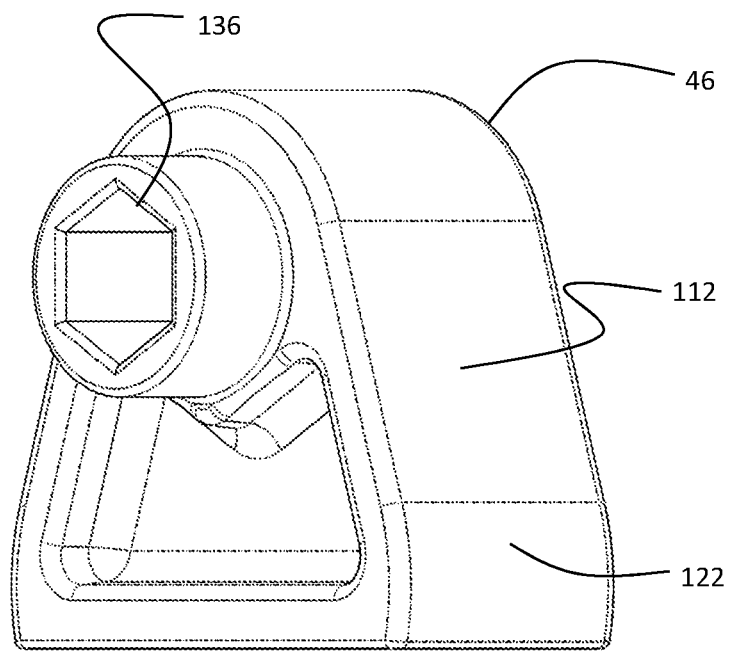
FIG. 14B is a perspective view of the drive cam.

The drive lever 46 shown in detail in FIGS. 14A and 14B has flat planes 112,114 (best seen in FIG. 14A) that mate with the walls 116, 118 of the piston cavity 100 when the vane system is at either end of its travel and becomes the system end stops. This gives a large surface area to resist wear when the vanes are at either of the two extremes of movement. When the piston is in an intermediate position, the two contact points in curved surfaces 120, 122 of the drive lever necessarily must have a width substantially equal to the inside width of the piston cavity (minus a small clearance which prevents binding). The drive lever contact points must form a locus of constant width, which is achieved by creating the dual curves surfaces 120, 122 which have a common center point and form a circular radius. The diameter of this circle is the desired inside width of the cavity 100 in piston 44 minus the operating clearance.

Figure 12A:
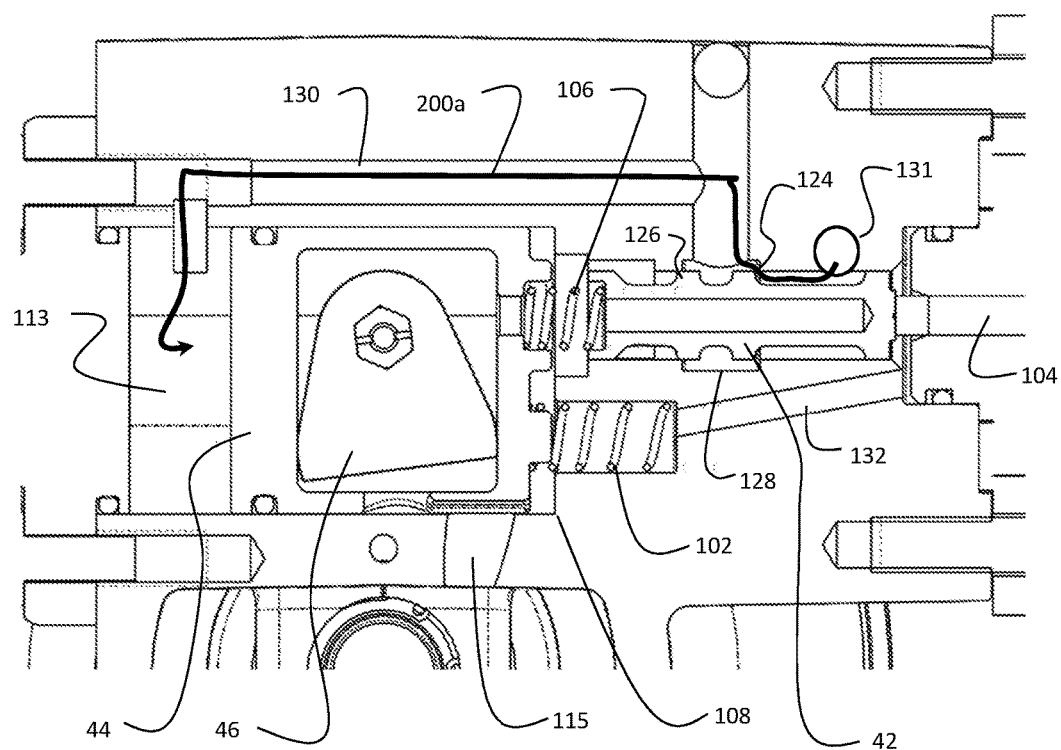
FIGS. 12A and 12B are a detailed section views of the integrated actuator showing flow paths for pressurizing and draining oil respectively.
Figure 12B:
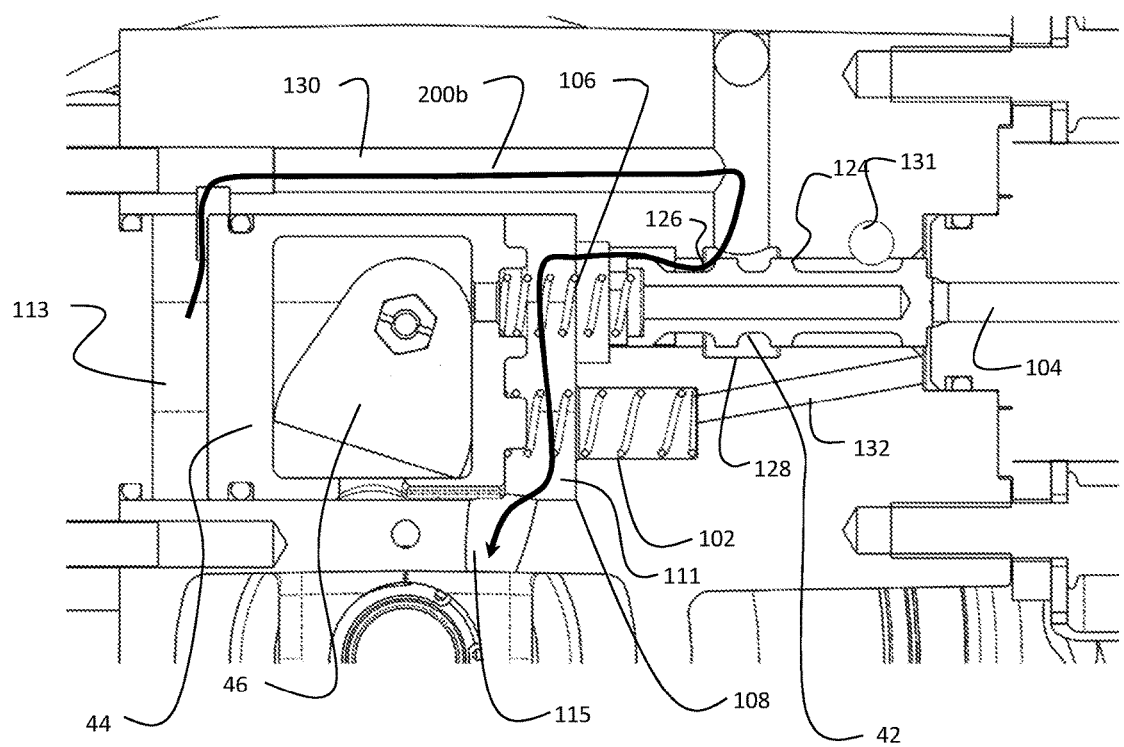

FIGS. 12A and 12B show the hydraulic elements and flow paths to supply oil to the piston pressure cavity 113 (FIG. 12A flow path designated by arrow 200a to move the vanes closed) and to drain oil from the piston drain cavity 111 (FIG. 12B flow path designated by arrow 200b to move the vanes open).

The spool 42 has a supply metering edge 124 and a drain metering edge 126 that mate with an annular cut 128 in the center housing. Oil is connected to an annular recess 130 of the spool on the solenoid side of the spool by a port 131 that connects to the main oil gallery of the turbocharger. The annular recess 130 acts as the oil supply for the hydraulic servo. When the force of feedback spring 106 is less than the force provided by the proportional solenoid 40 through pin 104, the spool 42 translates toward the spring and opens the supply metering edge 124. Oil then flows through the passage 130 to the hydraulic side of the piston in pressure cavity 113 as shown by arrow 200a, and the piston 44 translates toward the drain cavity side of chamber 108 rotating drive lever 46 counterclockwise causing the vanes to be more closed. As the piston moves toward the drain cavity side of chamber 108, the feedback spring compression increases and will at some point match the solenoid force. When the two forces are in balance, then the spool becomes in balance and the metering edges are closed, oil stops flowing and actuation system has achieved the position commanded by current supplied to the proportional solenoid. Control of the VGT may then be accomplished through simple current control to the proportional solenoid by a master engine computer.

Figure 15:
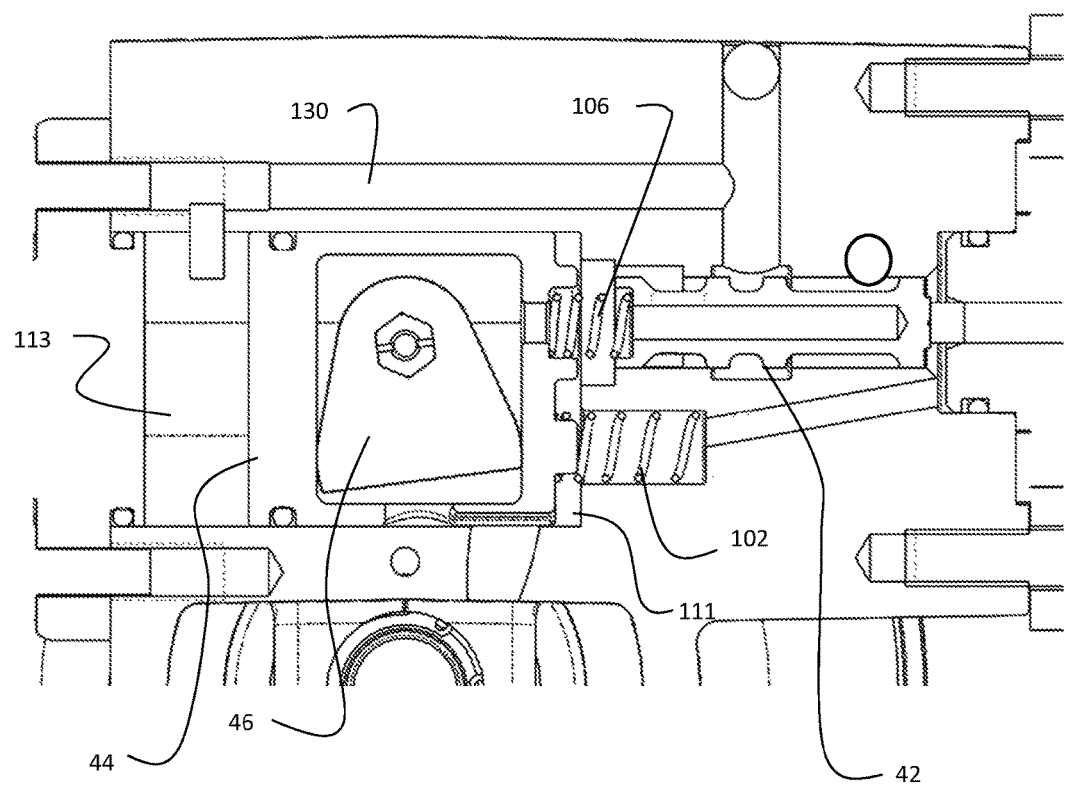
FIG. 15 is a partial side sectioned view of the integrated hydraulic servo actuator in the vanes closed position; and, FIG. 16 is a partial side sectioned view of the integrated hydraulic servo actuator in the vanes open position.
Figure 16:
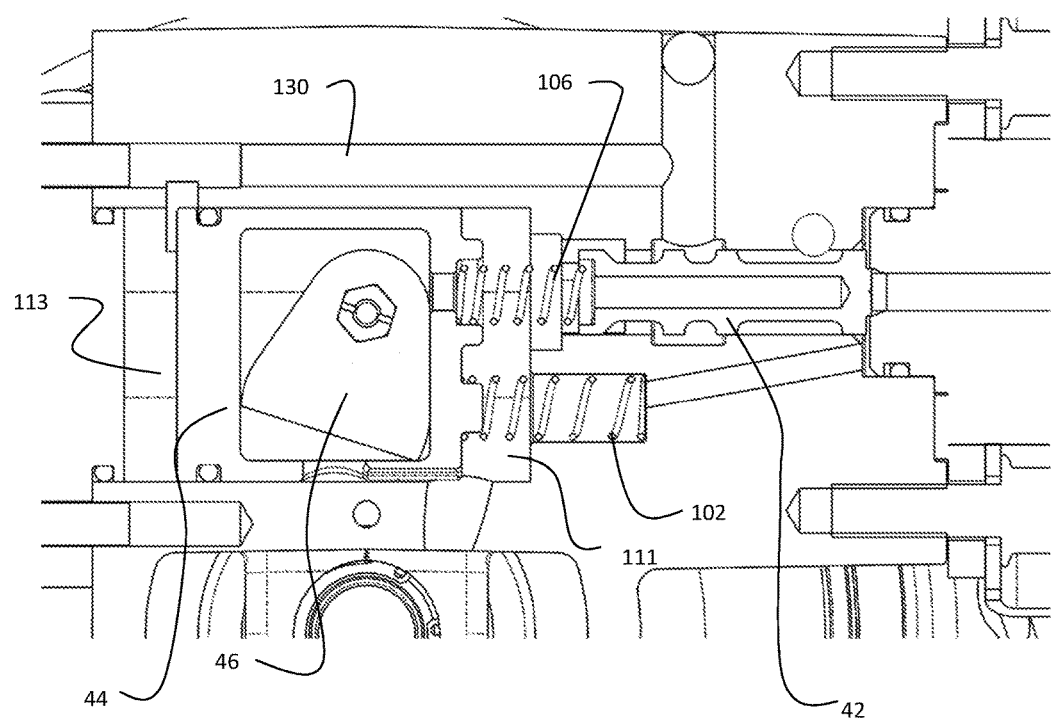

When the opposite situation happens, the feedback spring force is greater than the solenoid force, the spool moves toward the solenoid, opening up the drain metering edge 126. The oil passage to the hydraulic side of the piston in pressure cavity 113 is connected through the passage 130 to the drain cavity 111 between the spool and the piston as shown by arrow 200b and return spring 102 urges the piston 44 to translate toward the pressure cavity side of chamber 108. The piston and lever position for a fully open position of the vanes is shown in FIG. 16 while a fully closed position is shown in FIG. 15. The drain cavity 111 is also connected through passage 132 to the end of the spool 42 where it mates to the solenoid pin 104. This assures that there is no buildup of pressure on the end of the spool which could unbalance the system.

The actuating system employs master vane 32a which does not ride on a pin as do the other vanes. Instead, a hex shape hole in the peg of the vane is employed which allows the actuator shaft 48 (with a hex shaped section) to be pressed into the vane. Thus, the shaft drives the vane through the hex press fit, which then rotates the unison ring, which in turn drives the other vanes.

For assembly of the embodiment shown in the drawings, the drive lever 46 is first assembled loosely into the cavity 100 in the piston 44; then the piston inserted into the center housing chamber 108 wherein a boss 134 on the drive lever 46 (seen in FIG. 10) drops into a circular recess in the center housing. The piston is located laterally by a fixture, which orients the drive lever correctly. The actuating shaft 48 (with the primary vane 32a pressed on) can then be inserted through a bushing in the center housing and a hex shaped end can be pressed into a receiving hex shaped hole 136 (seen in FIGS. 14A and 14B) in the drive lever. The hex end of the shaft can be relieved with a slot(s) to reduce the stiffness of the hex and thus the press force requirements into the drive lever. The boss 134 on the drive lever positions the drive lever 46 in the precise position within the width of the chamber 108 in the piston 44. Chamber 108 is then closed with an end cap 138 seen in FIG. 11.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A variable geometry turbine (VGT) comprising:
   a turbine nozzle having a plurality of vanes each vane having an airfoil with an inner disc and an outer disc;
   a first nozzle plate having pockets to receive the inner discs, said inner discs substantially flush with a nozzle surface on the first nozzle plate;
   a second nozzle plate having pockets to receive the outer discs, said outer discs substantially flush with a second nozzle surface; and
   an actuation system rotating the plurality of vanes wherein each vane further comprises a drive peg extending from the inner disc, said drive peg having a key to engage a unison ring.

2. The VGT as defined in claim 1 wherein the first nozzle plate has an inner circumference wall and the keys extend through windows relieved through the wall in the pockets in the first nozzle plate.

3. The VGT as defined in claim 1 further comprising:
   an actuating shaft;
   a master vane receiving the actuating shaft in a hole in a drive peg; and,
   a master pocket in the first nozzle plate incorporates an enlarged bore receiving the actuating shaft, a key extending from the drive peg of the master shaft engaging the unison ring.

4. The VGT as defined in claim 3 wherein the actuation system comprises:
   a single acting hydraulic servo driven by a proportional solenoid.

5. The VGT as defined in claim 4 wherein the single acting hydraulic servo comprises:
   a spool positioned by a pin of the proportional solenoid, said spool having an oil supply metering edge and a drain metering edge positionable for connecting an oil source and an oil drain, respectively, with a passage; and,
   a piston received in a chamber in a center housing, said chamber having a pressure cavity in communication with the passage, said piston translating toward a drain cavity in the chamber responsive to connection of the oil source to the passage and translating toward the pressure cavity responsive to connection of the oil drain to the passage.

6. The VGT as defined in claim 5 further comprising a return spring urging the piston toward the pressure cavity.

7. The VGT as defined in claim 6 wherein the piston incorporates a cavity and the actuation system further comprises a drive lever carried within the cavity.

8. The VGT as defined in claim 7 wherein the actuating shaft is connected to the drive lever.

9. The VGT as defined in claim 8 wherein the drive lever incorporates flat planes that mate with walls in the cavity of the piston when the piston is at either end of its travel.

10. The VGT as defined in claim 9 wherein the drive lever incorporates contact points forming a locus of constant width, achieved by dual curved surfaces which have a common center point and form a circular radius.

11. The VGT as defined in claim 5 further comprising a feedback spring between the spool and the pin of the proportional solenoid.

12. The VGT as defined in claim 1 wherein each of the plurality of vanes further incorporates a pressure equalization bore extending through the inner and outer discs and airfoil.

13. The VGT as defined in claim 1 wherein the actuation system is integrally contained within a center housing.

14. A variable geometry turbine (VGT) for turbochargers comprising:
   a turbine nozzle having a plurality of vanes each vane having an airfoil with an inner disc and an outer disc;
   a first nozzle plate having pockets to receive the inner discs, said inner discs substantially flush with a nozzle surface on the first nozzle plate;
   a second nozzle plate having pockets to receive the outer discs, said outer discs substantially flush with a second nozzle surface;
   an actuation system rotating the plurality of vanes, and
   a bearing pin for each of the plurality of vanes, said bearing pin extending from the first nozzle plate and received in a aperture in a drive peg.

15. The VGT as defined in claim 14 wherein each of the plurality of vanes has a hole extending through the vane concentric with the aperture in the drive peg and said bearing pin includes a post extending through the hole to protrude beyond the outer disc, said pockets in the second nozzle plate having reliefs to receive the posts whereby said second nozzle plate supported in the posts.

16. A variable geometry turbine turbocharger comprising:
   a turbine nozzle having a plurality of vanes each vane having an airfoil with an inner disc and an outer disc;
   a first nozzle plate having pockets to receive the inner discs, said inner discs substantially flush with a nozzle surface on the first nozzle plate;
   a second nozzle plate having pockets to receive the outer discs, said outer discs substantially flush with a second nozzle surface;
   an actuating shaft;
   a master vane receiving the actuating shaft in a hole in a drive peg; and,
   a master pocket in the first nozzle plate incorporating an enlarged bore receiving the actuating shaft, a key extending from the drive peg of the master shaft engaging the unison ring;
   a single acting hydraulic servo driven by a proportional solenoid, said servo having:
   a spool positioned by a pin of the proportional solenoid, said spool having an oil supply metering edge and a drain metering edge positionable for connecting an oil source and an oil drain, respectively, with a passage; and,
   a piston received in a chamber in a center housing, said chamber having a pressure cavity in communication with the passage, said piston translating toward a drain cavity in the chamber responsive to connection of the oil source to the passage and translating toward the pressure cavity responsive to connection of the oil drain to the passage, said piston positioning a drive lever rotating the actuating shaft;
   a return spring urging the piston toward the pressure cavity; and,
   a feedback spring between the spool and the pin of the proportional solenoid.

* * * * *